United States Patent

Grise

[15] 3,672,631

[45] June 27, 1972

[54] VALVE AND ACTUATOR THEREFOR

[72] Inventor: Frederick G. J. Grise, Box 112, West Brookfield, Mass. 01585

[22] Filed: Nov. 16, 1970

[21] Appl. No.: 89,950

[52] U.S. Cl.......................251/149.6, 251/149.9, 137/541, 285/305

[51] Int. Cl.......................................F16l 29/00, F16l 37/28

[58] Field of Search..............251/149.8, 149.9, 149.6, 149.5, 251/339; 137/541; 285/86, 85, 304, 305, 308, 321

[56] References Cited

UNITED STATES PATENTS

| 144,844 | 11/1873 | Gould et al. | 137/541 |
|---|---|---|---|
| 762,078 | 6/1904 | Morgan | 137/541 |
| 2,244,997 | 6/1941 | Leppel | 137/541 |
| 3,095,899 | 7/1963 | Billington | 251/149.6 X |
| 3,131,718 | 5/1964 | Mingrone | 137/541 X |
| 3,542,057 | 11/1970 | Staiano | 137/541 X |
| 2,898,130 | 8/1959 | Hansen | 285/321 X |
| 3,567,175 | 3/1971 | Sciuto, Jr. | 251/149.6 |
| 2,765,181 | 10/1956 | Butterfield | 285/304 X |

*Primary Examiner*—William R. Cline
*Attorney*—Charles R. Fay

[57] ABSTRACT

A full-flow tank valve and valve actuator, the valve comprising a thimble adapted for application to a tank and having an apertured bottom forming a seat, a movable imperforate member to open or close the apertures, said member including guides extending through certain of the apertures, and resilient means acting on the guides to draw the member to valve closed position against the bottom, said actuator including means for engaging the guides and opening the valve and applying gas to the tank therethrough, with locking means for the thimble.

12 Claims, 6 Drawing Figures

INVENTOR
FREDERICK G. J. GRISÉ

BY Charles P. Fay
ATTORNEY ered to the disc, the seal formed by engagement of the O-ring with the thimble bottom around apertures 26 is sufficient to keep the disc closed under conditions of vacuum.

VALVE AND ACTUATOR THEREFOR

BACKGROUND OF THE INVENTION

A problem in pressure vessels, e.g., air conditioners, has been to provide a sufficient amount of fluid to the vessel in a simple and economical manner. Part of the problem lies in closing the vessel, e.g., the tank, after fluid gas has been inserted, without losing a good deal of the pressure or volume. Another problem has always been the coupling of the fluid source with relation to the appliance tank and uncoupling the same as fast as possible in order not to let fluid escape until the vent hole can be plugged by whatever means is used for this purpose.

It is the object of the present invention to obviate these difficulties, to inject the fluid and operate a tank valve from a closed to an open position and then to close the valve, it being one of the requirements in this particular case that the valve be full-flow and positively actuated and also to be properly guided to positively act in order to close off the vent permanently without leaking.

SUMMARY OF THE INVENTION

Attention is directed to co-pending application, Ser. No. 11,582, filed Feb. 16, 1970, now U.S. Pat. No. 3,618,644.

A special thimble having a flange for securement to a tank and a bottom with several apertures is provided with an interior groove. An imperforate movable disc with a surface mounted O-ring closes or opens the apertures, and the disc has a guide thereon extending through certain of the apertures into the thimble. The guide comprises a series of flat fingers with undercut edges under which is located a wire spring holding the disc with the O-ring against the bottom of the thimble, the O-ring surrounding all the apertures, and the spring reacting against the thimble bottom at the opposite side thereof from the disc.

A tool comprising gas-conducting tube, an outer shell therefor, and an operating nut, has a ball-detent lock to attach it to the thimble which has an interior groove to receive the balls, gas seals, etc. This tool is actuated, when locked to the thimble, to open the valve by engaging the disc guide fingers, forcing the same and the disc in a direction to open the valve by uncovering the apertures in the bottom of the thimble. Reverse actuation of the operating nut allows the spring to return the disc to valve-closed position, prior to release of the ball-detents, for removal of the tool from the valve.

The disc guides and the apertures are sized and proportioned to provide full gas flow as well as properly guiding the disc, and also adequately supporting the spring for positive holding and actuation thereof.

PREFERRED EMBODIMENT OF THE INVENTION

Figure 1:
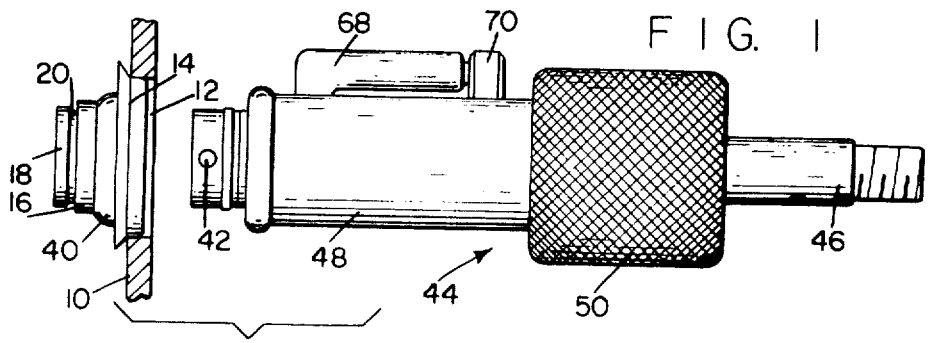
FIG. 1 is a view in elevation showing the valve in the wall of a tank and the tool about to be thrust into the valve to actuate it.

The wall of the tank for the gas, e.g., Freon 22, for operating the appliance, i.e., air conditioner, etc., is indicated at 10. It has a hole 12 in which is inset the flange 14 of a valve part, e.g., thimble 16, which is located substantially wholly within the tank. No part of the valve extends outwardly of the tank or even to the outer surface thereof, but this valve is permanently secured in position as shown.

A disc 18 having a face mounted O-ring 20 in an undercut peripheral groove 22 is slidably mounted on the bottom 24 of the thimble to open and close apertures at 26 in the thimble bottom. On the face of the disc having the O-ring there are a plurality of guide fingers 28 at right angles to the plane of the disc and of the thimble bottom. Each finger has a double incline outer edge, one at e.g., 45° and the other at a lesser angle to the axis of the disc and thimble, see 30 and 32 respectively. In the case disclosed, the fingers are in the form of a cross, and extend through like apertures at 34 in the bottom of the thimble, see FIG. 5.

Figure 2:
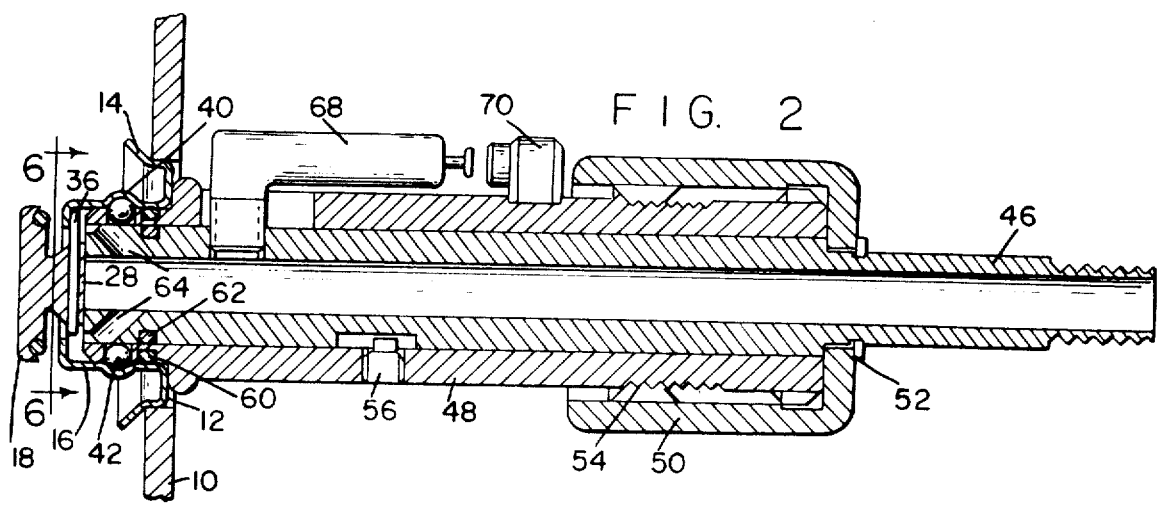
FIG. 2 is a longitudinal sectional view on a large scale showing the tool locked to the valve and the valve open.
Figure 3:
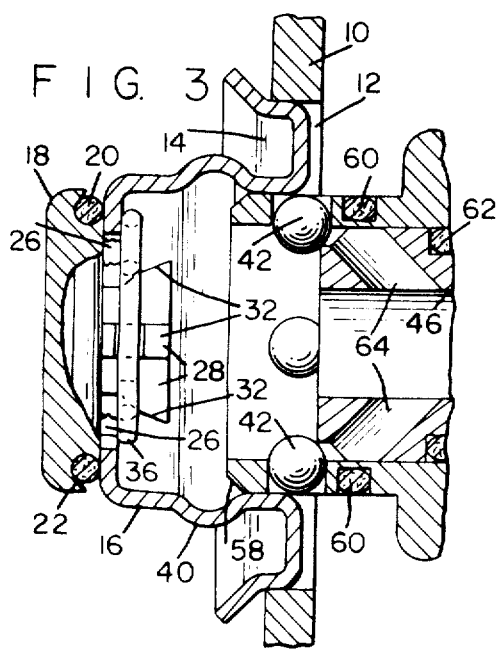
FIG. 3 is a sectional view on a still larger scale of the valve and the operative end of the tool, the gas tube being fully retracted, the tool unlocked, and the valve closed.
Figure 4:
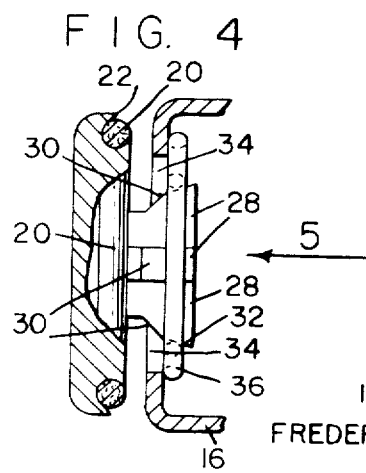
FIG. 4 is a view similar to FIG. 3 with parts omitted showing the valve open.
Figure 6:
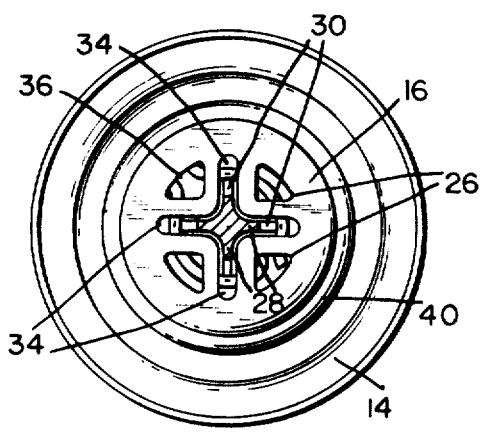
FIG. 6 is a sectional view taken on line 6—6 in FIG. 2 on a larger scale.

As the disc moves between open position, FIGS. 2 and 4, and closed position, FIGS. 1 and 3, the cross apertures 34 properly guide it by means of fingers 28 riding on the edges of the apertures, while apertures 26 are covered and uncovered for full flow of the gas therethrough.

Figure 5:
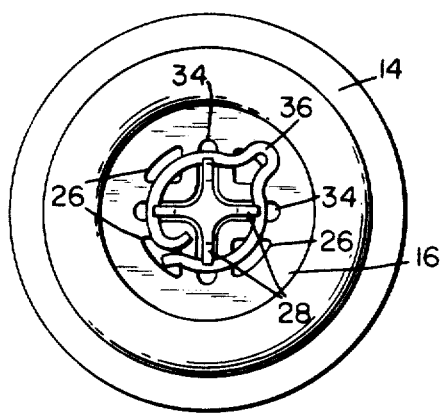
FIG. 5 is a view in elevation looking in the direction of arrow 5 in FIG. 4.

A simple wire spring 36, see FIG. 5, is formed to lie flatly against the interior surface of the thimble bottom at all times and underlies the undercut edges of guide fingers 28. FIG. 5 shows the spring underlying the finger edges at 32, as in FIG. 4, and the spring is thus spread and the valve is open. If released, the spring forces its way to a contracted position underlying finger edges 30, FIG. 3, closing the valve.

The fingers 28 terminate in a co-planar arrangement forming an abutment for a tool to depress the same upon pressure being exerted to the left as is illustrated in FIG. 2. Just to the right of this abutment, or outwardly relative to the tank and the valve thimble, the latter has an outwardly directed annular groove 40 for the locking reception of the ball detents 42 on the gas applying tool generally indicated at 44.

This tool comprises three main parts: gas tube 46, outer shell 48, and actuator nut 50. The nut is rotatively mounted in longitudinally fixed relation relative to the gas tube as at 52 and is threaded to the outer shell as at 54. Rotating the nut causes longitudinal motion of the gas tube in the outer shell limited by the limit stop 56.

The balls 42 are mounted in corresponding holes in the outer shell at the extreme left hand end thereof which has a bevel at 58 for easy insertion in the thimble. The extreme left end of the gas tube 46 holds the balls against falling inwardly and at the same time forces them outwardly from the FIG. 3 unlocked condition to the FIG. 2 locked position in groove 40 in the thimble as the nut 50 is rotated to cause the gas tube to move to the left. The forward end of the gas tube engages the co-planar ends of fingers 28 and forces them and disc 18 to valve open position, but only after the balls 42 are locked as described, with the left end of the outer shell 48 surrounding the fingers 28. The outer shell has an annular gas seal 60 for cooperation with the thimble and this seats prior to the opening of the valve, and the same is true of gas seal 62 on the gas tube.

In order to assure full gas flow, the gas tube has extra inclined ports 64 communicating with the space between the extreme end of the gas tube and the thimble bottom where the spring 36 is located. The spring does not interfere to any great extent with the gas flow, as can be seen in FIG. 5. The spring crosses material of the thimble bottom many times between apertures 26 and 34 and is thus firmly held against any tendency to bend under influence of fingers 28.

Reference character 68 indicates a bleed valve of known characteristics which dumps line pressure by abutting shoulder 70 after the valve re-closes but before the ball detent is released upon retraction of the gas tube relative to the outer sleeve 48, when the tank has received the required pressure and the nut 50 is backed off. A gas line to the gas tube has an on and off valve not shown.

The disc will not open against the spring under conditions of vacuum in the tank, the angle at 22 on the disc for seal 20 prevents any blowing in or out, the actuator tool locks and seals before the valve opens and the valve closes before the tool unlocks. Even though the spring is not actually mechanically locked it cannot leave the valve regardless of actuation, and of course the valve is normally closed. The spring provides equal closing force on each finger 28 with a minimum, usually no, rotational force, allowing equal distribution of forces on seal 20 with little or no distortion, and the apertures in the thimble bottom all cooperate to provide the fullest flow with the least distortion of the valve parts and with the minimum of dimension in all directions. A dust cap can be applied to the thimble to prevent unauthorized tampering and no part of the valve protrudes beyond the surface of the tank.

I claim:

1. A valve comprising a thimble open at one end, an imperforate disc, means movably mounting the disc on the thimble to selectively close and open the open end of the thimble, said means comprising resilient means within the thimble, means on the thimble holding the resilient means against escape therefrom through the open end thereof, said resilient means being expansible, spaced guide fingers on the disc extending into the thimble through said one open end and including cam portions engaging the resilient means at the side aspect thereof opposite the disc, said guide finger cam portions holding the resilient means in position and the latter in turn holding the disc in closed position of said open end of the thimble, the guide finger cam portions expanding the resilient means upon pressure exerted on the guide fingers in a direction toward the disc and thereby allowing such pressure to move the guide fingers and disc in a direction to uncover the open end of the thimble to thereby open the valve, and means on the thimble guiding the guide fingers in the motion thereby, the resilient means bearing on the guide finger cam portions returning the disc to valve closed position upon release of paid pressure.

2. The valve of claim 1 wherein said resilient means crosses the spaces between fingers a plurality of times.

3. The valve of claim 1 including a gas applying tool to open the valve by engaging and pressing on the guide fingers.

4. The valve of claim 1 including a gas applying tool to open the valve by engaging and pressing on the guide fingers and means to lock the tool to the thimble.

5. The valve of claim 4 wherein the locking means includes ball detents on the tool and an interior groove in the thimble to receive the detents.

6. The valve of claim 4 wherein the tool locking means includes ball detents on the tool and an interior groove in the thimble to receive the detents, and means on the tool to move the detents into the groove.

7. The valve of claim 4 wherein the tool locking means includes ball detents on the tool and an interior groove in the thimble to receive the detents, and means on the tool to move the detents into the groove, said last named means comprising a gas tube, there being means on the tool to move the gas tube relative to the detents to move the latter into the groove.

8. The valve of claim 4 wherein the tool locking means includes ball detents on the tool and an interior groove in the thimble to receive the detents, and means on the tool to move the detents into the groove, said last named means comprising a gas tube, there being means on the tool to move the gas tube relative to the detents to move the latter into the groove, said gas tube also including means to engage the fingers and move the disc.

9. The valve of claim 4 wherein the tool locking means includes ball detents on the tool and an interior groove in the thimble to receive the detents, and means on the tool to move the detents into the groove, said last named means comprising a gas tube, there being means on the tool to move the gas tube relative to the detents to move the latter into the groove, said gas tube also including means to engage the fingers and move the disc, said locking means being constructed and arranged to lock prior to the opening of the valve and to remain locked until after the reclosing of the valve by the resilient means after disengagement of the fingers by the gas tube.

10. The valve of claim 1 wherein the spaces between fingers form gas flow passages.

11. The valve of claim 1 wherein the resilient means underlies the cam portions of the fingers.

12. The valve of claim 1 wherein the cam portions have different angles bearing on the resilient means at different positions of the disc.

* * * * *